US005907971A

United States Patent [19]

Sato et al.

[11] Patent Number: 5,907,971

[45] Date of Patent: Jun. 1, 1999

[54] DEVICE FOR RETURNING RECIPROCATING MECHANISM TO PREDETERMINED POSITION

[75] Inventors: Hisaaki Sato; Ikuo Mogi, both of Gunma; Masato Kumagai, Saitama; Munehiro Kudo; Keiichi Kai, both of Gunma, all of Japan

[73] Assignee: Unisia Jecs Corporation, Atsugi, Japan

[21] Appl. No.: 09/002,948

[22] Filed: Jan. 5, 1998

[30] Foreign Application Priority Data

Jan. 9, 1997 [JP] Japan .................................... 9-002083

[51] Int. Cl.$^{6}$ ..................................................... F16H 21/44

[52] U.S. Cl. ..................................................... 74/96; 74/25

[58] Field of Search ............................................ 74/25, 96

[56] References Cited

U.S. PATENT DOCUMENTS 943,274 12/1909 Schoenhag .................................. 74/25

FOREIGN PATENT DOCUMENTS 2-500677 3/1990 Japan .
88/02064 3/1988 WIPO .

*Primary Examiner*—John Fox
*Attorney, Agent, or Firm*—Foley & Lardner

[57] ABSTRACT

A device for returning a reciprocating mechanism to a predetermined intermediate position of reciprocating motion, comprises a reciprocating link movable in accordance with a predetermined reciprocating motion, a pair of positioning members provided at both sides of the predetermined intermediate position of reciprocating motion, a pair of movable blocks, and a single resilient member interconnecting the movable blocks. The positioning members is adapted to position the movable blocks by abutting the movable blocks against the respective positioning members via a biasing force created by the single resilient member. The movable blocks is adapted to return the reciprocating link to its predetermined intermediate position by abutment of the reciprocating link on both the movable blocks, for restricting a reciprocating motion of the reciprocating link via the biasing force created by the single resilient member. During the reciprocating motion, one of the movable blocks breaks contact with the associated positioning member and additionally the reciprocating link breaks contact with the other positioning member by pushing the associated one of the movable blocks in a direction of increasing the biasing force created by the single resilient member.

6 Claims, 3 Drawing Sheets

DEVICE FOR RETURNING RECIPROCATING MECHANISM TO PREDETERMINED POSITION

The contents of Application No. TOKUGANHEI 9-2083, filed Jan. 9, 1997, in Japan is hereby incorporated by reference.

BACKGROUND OF THE INVENTION

1. Field of the Invention

The present invention relates to a device for returning or holding a reciprocating mechanism, such as a valve opening-and-closing mechanism reciprocating as along a straight line or along a curved line, a swinging mechanism oscillating across its neutral position in a straight line or in a curved line or the like, to or at a predetermined position, and specifically to a return-to-neutral device which is applicable to a throttle-returnmechanism of an electronically-operated throttle valve.

2. Description of the Prior Art

In recent years, there have been proposed and developed various return-to-neutral devices suitable for a throttle-return mechanism for automotive engines. One such return-to-neutral device has been disclosed in an international application No. PCT/DE87/00404, filed Sep. 4, 1987 (PCT publication No. WO 88/02064, published Mar. 24, 1988), corresponding to Japanese patent publication No. 2-500677, published Mar. 8, 1990. Referring now to FIG. 3, there is shown a throttle-return device for an electronically-controlled throttle valve 2, as disclosed in the international application No. PCT/DE87/00404. As seen in FIG. 3, the throttle valve 2, interleaved in the intake-air passage 1, is driven by means of a throttle-valve actuator 3 such as an electric motor often called a "throttle motor". The throttle-valve actuator 3 is controlled in response to a control signal (or a drive signal) from an electronic control unit (ECU) or an electronic engine control module (ECM), irrespective of depression of the driver. The conventional throttle-return device includes a first resilient member 5 such as a helical torsion spring and a second resilient member 6 such as a helical torsion spring. The first resilient member 5 is connected to one end of the throttle-valve shaft 4 for biasing the throttle-valve shaft in a direction of wide-open throttle (clockwise, viewing FIG. 3), whereas the second resilient member 6 is connected to the other end of the throttle-valve shaft 4 for biasing the throttle-valve shaft in a direction of closed throttle. For example, when the ECU or the throttle-valve actuator (the throttle motor)does not operate owing to breakage in harness connector to the ECU, faulty throttle motor, loose or poor connector contact, or the like, the throttle-return device disclosed in the international application No. PCT/DE87/00404 functions to return or hold the electronically-controlled throttle valve 2 to a predetermined substantially neutral throttle-opening position or a predetermined intermediate angular position by virtue of proper balance between the clockwise biasing force caused by the first resilient member 5 and the counter-clockwise biasing force caused by the second resilient member 6. In the electronically-controlled throttle valve, for example due to a faulty throttle control section of the ECM or a faulty throttle motor, the electronically-controlled throttle valve 2 remains in a closed position, there is a tendency that the engine fails to start. In this case, the use of the throttle-return device for the electronically-controlled throttle valve 2 is effective to prevent the engine from failing to start. In automotive vehicles with an electronically-controlled throttle valve as described above, in order to compensate for load on/off modes at idle, the opening of the throttle valve 2 is controllable depending on engine load changes resulting from an increased load of a power steering, an air conditioner turned on or off, or changes in the other electrical loads. Thus, on vehicles employing such an electronically-controlled throttle valve, a so-called auxiliary-air control valve (generally abbreviated to "ACC valve"), or an idle speed control valve (generally abbreviated to "ISC"), or a fast idle control device (generally abbreviated to "FICD") can be eliminated. However, without the auxiliary-air control valve, there is no air-supply bypassing the throttle valve when starting the engine. Thus, if the electronically-controlled throttle valve 2 is placed into the closed position when the engine is stopped, intake air cannot be delivered into the engine cylinder with the throttle valve closed. In this case, the accelerator pedal must be depressed for starting the engine. To avoid this, automotive vehicles with an electronically-controlled throttle valve generally employ the previously-noted throttle-return device. The conventional throttle-return device disclosed in the international application No. PCT/DE87/00404 utilizes a proper balance of biasing-force between the two resilient members 5 and 6 in order to return the throttle valve to the predetermined intermediate angular position. The previously-noted conventional throttle-return device comprising at least the first and second resilient members, namely two different torsion springs 5 and 6, suffers from the drawback that it is difficult to set pre-loads of the first and second springs 5 and 6 in such a manner as to conform a first spring rate, measured when beginning to open the throttle valve 2 from the predetermined intermediate angular position to a second spring rate, measured when beginning to close the throttle valve 2 from the predetermined intermediate angular position. This lowers the controllability of the throttle valve in both directions, namely a direction of the opening-throttle mode and a direction of the closing-throttle mode. A slight manufacturing error of spring rate of the first resilient member 5 and a slight manufacturing error of spring rate of the second resilient member 6 may cause an increased deviation of a spring-loaded position of the throttle valve 2 from the predetermined intermediate angular position. As a result of the use of two resilient members 5 and 6, the structure of the conventional throttle-return device is complicated, thus increasing the time required for assembling, and total production cost of the throttle-return device. The complicated structure of the device composed of the two different resilient members 5 and 6 requires an increased mounting space. The two springs 5 and 6 must be installed on the respective different positions. This is troublesome. As set forth above, a conventional reciprocating-mechanism return device such as a throttle-return device composed of at least two resilient members is insufficient from the view point of a controllability of a reciprocating member (for example a throttle valve) in both directions of reciprocating motion, an increased degree of freedom in designing, a simple structure and reduction in installation efficiency and production costs.

SUMMARY OF THE INVENTION

Accordingly, it is an object of the invention to provide a device for returning a reciprocating mechanism, such as a valve opening-and-closing mechanism, a swinging mechanism or the like, to a predetermined position, which avoids the aforementioned disadvantages of the prior art.

It is another object of the invention to provide a relatively simple return-to-neutral device for a throttle-return mechanism of an electronically-controlled throttle valve in which the throttle valve is returned accurately to a predetermined substantially intermediate angular position with a throttle actuator placed into its in-operative state, irrespective of the presence of slight manufacturing errors or fluctuations of the throttle-return mechanism.

It is a further object of the invention to provide a relatively simple return-to-neutral device for a throttle-return mechanism of an electronically-controlled throttle valve, which insures a high controllability of the throttle valve in both directions, namely the throttle opening and closing directions, irrespective of the presence of slight manufacturing errors or fluctuations of the throttle-return mechanism.

In order to accomplish the aforementioned and other objects of the present invention, a device for returning a reciprocating mechanism to a predetermined intermediate position of reciprocating motion, comprises a reciprocating link being included in the reciprocating mechanism and being movable in accordance with a predetermined reciprocating motion, a pair of positioning members provided at both sides of the predetermined intermediate position of reciprocating motion, a pair of movable members provided at both sides of the predetermined intermediate position of reciprocating motion, a single resilient member interconnecting the movable members, the positioning members being adapted to position the movable members by abutting the movable members against the positioning members via a biasing force created by the single resilient member, and the movable members being adapted to return the reciprocating link to the predetermined intermediate position of reciprocating motion by abutment between the reciprocating link and both of the movable members, for restricting a reciprocating motion of the reciprocating link via the biasing force created by the single resilient member, wherein, during the reciprocating motion of the reciprocating link, a first movable member of the movable members breaks contact with a first positioning member of the positioning members and additionally the reciprocating link breaks contact with a second positioning member of the positioning members by pushing the first movable member in a direction of increasing the biasing force created by the single resilient member. The use of the single resilient member enables a spring-rate characteristic, obtained at the beginning of movement of the reciprocating link in one direction of reciprocating motion from the predetermined intermediate position to conform to a spring-rate characteristic, obtained at the beginning of movement of the reciprocating link in the opposing direction from the predetermined intermediate position, thus enhancing the controllability of the reciprocating mechanism in both directions of reciprocating motion.

In the above-mentioned device, the reciprocating link may be connected to a valve body such as a throttle valve of an internal combustion engine, an exhaust-gas recirculation valve often called an "EGR valve", or a directional control valve for use in a general industrial equipment. As discussed above, when the device of the invention is applied as a return-to-neutral device for a valve body, the practicality of the device is very high. Particularly, when the above-noted device is applied to an electronically-controlled throttle valve mechanism which is electronically controlled by way of a controlled driving force output from a throttle actuator depending on a control signal from an electronic control unit (ECU) or an electronic engine control module (ECM), the return-to-neutral device exhibits a superior effect for example a fail-safe function in presence of unintended accidents such as the throttle actuator failure, the ECU failure, the ECU harness-connector breakage or the like. The previously-noted single resilient member may comprise a tension spring or a compression spring. In case that the return-to-neutral operation is achieved by way of a single resilient member consisting of a tensile spring or a compression spring, a degree of freedom in designing may be increased, and also the entire size of the return-to-neutral device can be reduced, thus enabling easy installation of the device into the throttle body. It is preferable a guide groove is provided in the throttle body for guiding the movable members along a predetermined line conforming essentially to the reciprocating motion of the reciprocating link to insure a smooth motion of each of the movable members.

DESCRIPTION OF THE PREFERRED EMBODIMENTS

First Embodiment

Figure 1:
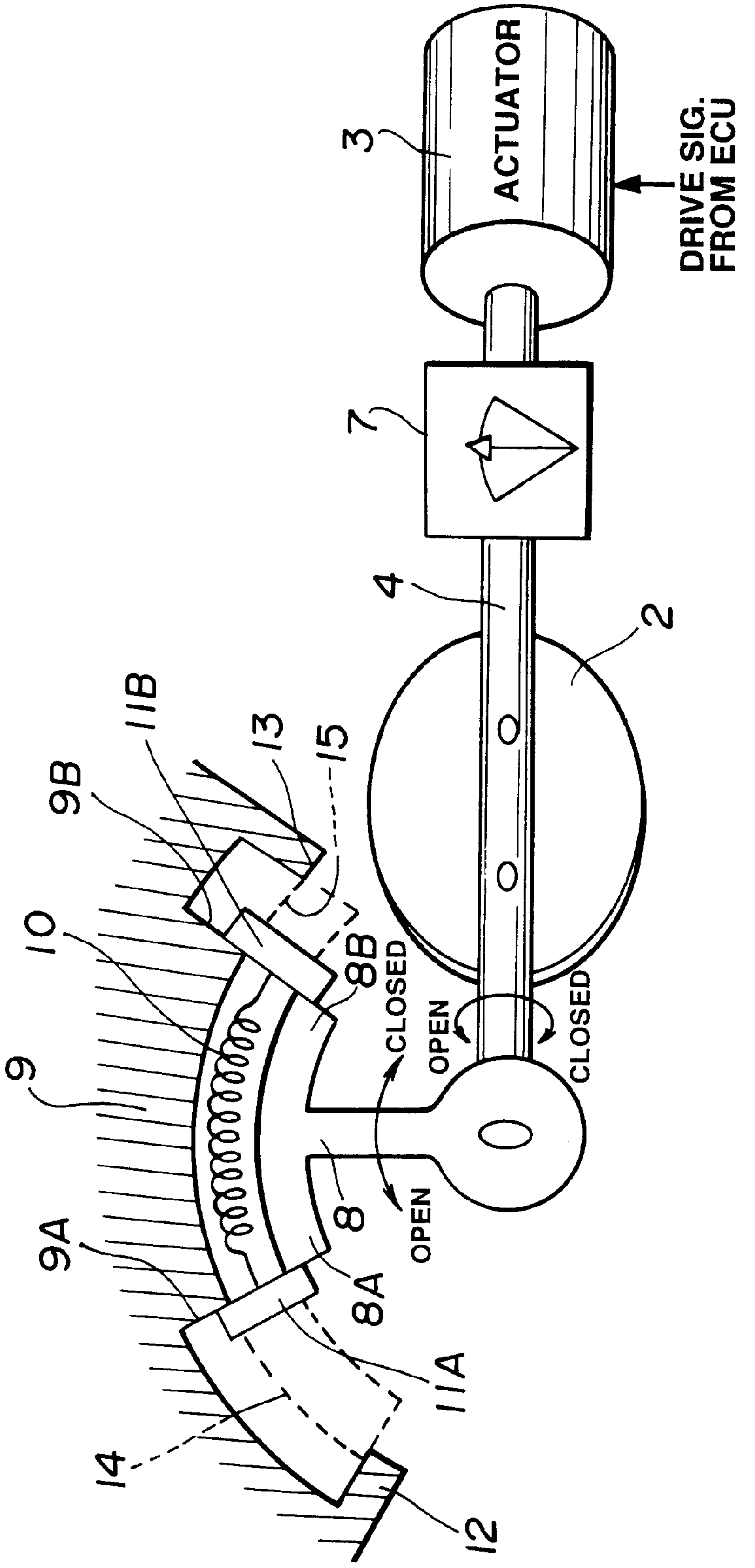
FIG. 1 is a system diagram illustrating a first embodiment of a return-to-neutral device, being applicable to a throttle-return mechanism, according to the invention.

Referring now to the drawings, particularly to FIG. 1, the return-to-neutral device of the first embodiment is exemplified in case of an electronically-controlled throttle valve for an automotive vehicle employing an electronic control unit (ECU) or an electronic engine control module (ECM). In the first and second embodiments respectively shown in FIG. 1 and 2, the same reference signs used to designate elements in the conventional device shown in FIG. 3 will be applied to the corresponding elements used in the improved device shown in FIGS. 1 and 2, for the purpose of comparison between the conventional device of FIG. 3 and the improved devices of FIGS. 1 and 2.

Referring now to FIG. 1, an electronically-controlled throttle valve 2 is interleaved in the intake-air passage (not shown) to variably adjust an area of the intake-air passage, (i.e., the throttle opening) by varying the angular position of the throttle valve 2 by way of its rotation about the throttle-valve shaft 4. On electronically-controlled throttle valves, the opening of the throttle valve 2 is controlled by means of a throttle actuator 3 usually comprised of an electric motor. The throttle actuator 3 is driven in response to a drive signal or a control signal from the ECU (not shown). Usually, the opening of the throttle 2 is controllable in accordance with the control signal output from the ECU to the throttle actuator 3. The opening of the throttle valve 2 is feed-back controlled depending on the vehicle/engine operating conditions, such as engine load and speed. During the feed-back control for the throttle opening, the ECU uses an actual throttle opening from a throttle sensor 7 (exactly a throttle position sensor). In the shown embodiment, the throttle position sensor 7 comprises a variable resistor (or a potentiometer) connected to the throttle linkage. The return-to-neutral device of the first embodiment functions to return the throttle valve 2 to a predetermined intermediate angular position substantially midway between the wide-open throttle position (a full-throttle position) and the closed throttle position, when the throttle actuator is deactivated owing to failure of the throttle actuator 3 or the ECU, breakage in the harness connector to the ECU, or loose or poor connector contact. As clearly seen in FIG. 1, note that the return-to-neutral device of the first embodiment includes a single resilient member 10, for the purpose of recovery of the throttle valve 2 to the predetermined intermediate position (the intermediate throttle-opening position). The detailed structure of the return-to-neutral device of the first embodiment is hereinafter described.

As shown in FIG. 1, the return-to-neutral device of the first embodiment includes a throttle lever 8 fixedly connected to the throttle-valve shaft 4. The throttle lever 8 is formed at its outermost end with a pair of arcuated arm portions 8A and 8B respectively extending in two opposing rotational directions of the throttle lever 8. The throttle lever 8 and the arcuated arm portions 8A and 8B serve as a reciprocating member which reciprocates along a predetermined curved line. The throttle body of the engine defines therein an inwardly-projecting curved portion 9 so that the inwardly-projecting curved portion 9 completely opposes over the entire surface of the outer periphery of the arcuated arm portions 8A and 8B, when the throttle lever 8 is placed in its neutral position. The single resilient member 10 is operably disposed in a space or an aperture defined between the outer periphery of the arcuated arm portions 8A and 8B and the inner periphery of the inwardly-projecting curved portion 9. In the first embodiment, the resilient member 10 comprises a coiled tension spring. Both ends of the resilient member 10 (the coiled tension spring) are fixedly connected to a pair of movable blocks 11A and 11B, respectively. When there is no driving force of the throttle actuator 3, that is , the actuator 3 is de-activated, the two movable blocks 11A and 11B are spring-loaded by means of a predetermined spring bias (a predetermined tensile force or a set tensile force) of the single resilient member 10 consisting of the coiled tension spring, so that the inside wall surface of the movable block 11A abuts both the leftmost end of the arcuated arm portion 8A and the left-hand shoulder portion 9A of the inwardly-projecting curved portion 9, and so that the movable block 11B abuts both the rightmost end of the arcuated arm portion 8B and the right-hand shoulder portion 9B of the inwardly-projecting curved portion 9. In other words, the single tension spring 10 is installed in a manner so as to be pre-extended slightly by a predetermined length from its free length in the neutral position of the throttle valve unit. As may be appreciated, the left-hand and right-hand shoulder portions 9A and 9B of the inwardly-projecting curved portion 9 function to position the throttle linkage including the throttle lever 8 and the throttle-valve shaft 4 at the predetermined neutral position (corresponding to a predetermined throttle-valve intermediate angular position) when the throttle actuator 3 is de-activated. Reference sign 12 denotes a wide-open throttle position stopper 12, simply a wide-open throttle stop, whereas reference sign 13 denotes a closed throttle position stopper 13, simply a closed throttle stop. When the throttle actuator 3 generates a driving force acting in the rotational direction of throttle-valve opening (clockwise direction, viewing FIG. 1), and thus the left-hand side movable block 11A is rotated in the anti-clockwise direction (viewing FIG. 1) through the throttle linkage, namely the throttle-valve shaft 4, the throttle lever 8 and the arcuated arm portion 8A, the maximum possible anti-clockwise angular displacement of the left-hand side movable block 11A (or the maximum possible angular displacement of the throttle valve 2 in the valve opening direction) is restricted by the previously-noted wide-open throttle stop 12. On the contrary, when the throttle actuator 3 generates a driving force acting in the rotational direction of throttle-valve closing (counterclockwise direction, viewing FIG. 1), and thus the right-hand side movable block 11B is rotated in the clockwise direction (viewing FIG. 1) through the throttle-valve shaft 4, the throttle lever 8 and the arcuated arm portion 8B, the maximum possible clockwise angular displacement of the right-hand side movable block 11B (or the maximum possible angular displacement of the throttle valve 2 in the valve closing direction) is restricted by the previously-noted closed throttle stop 13. The wide-open throttle stop 12 and the closed throttle stop 13 are effective to prevent stepped wear resulting from wall-surface collision of the edge of the throttle valve 2 with the inner wall surface of the intake-air passage during the full throttle mode or during the closed throttle mode, or to prevent the throttle valve from remaining closed or fully opened owing to galling between the inner wall surface of the intake-air passage and the edge of the throttle valve 2. In case that the throttle valve 2 and the intake-air passage are machined with a high accuracy, and thus there is no possibility of undesirable galling and stepped wear, it may be unnecessary to provide the previously-noted wide-open throttle stop 12 and the closed throttle stop 13. With the previously-noted arrangement of the first embodiment, if the throttle actuator 3 is not activated owing to the throttle motor failure or the failed ECU, the movable blocks 11A and 11B are both attracted toward the central position of the two arcuated arm portions 8A and 8B of the throttle lever 8 by way of the spring bias (tensile force) of the single resilient member 10 (the coiled tension spring) whose both ends are connected to both the movable blocks 11A and 11B. As a result, the left-hand movable member 11A abuts both the left-hand shoulder portion 9A of the inwardly-projecting curved portion 9 and the left-hand arcuated arm portion 8A with the predetermined spring load, whereas the right-hand movable member 11B abuts both the right-hand shoulder portion 9B of the inwardly-projecting curved portion 9 and the right-hand arcuated arm portion 8B with the same predetermined spring load. Therefore, the anti-clockwise rotational motion of the left-hand arm portion 8A of the throttle lever 8 with respect to the throttle-valve opening direction is restricted by the left-hand movable block 11A abutting the left-hand shoulder portion 9A by virtue of the predetermined spring load, while the clockwise rotational motion of the right-hand arm portion 8B of the throttle lever 8 with respect to the throttle-valve closing direction is restricted by the left-hand movable block 11B abutting the right-hand shoulder portion 9B by virtue of the predetermined spring load (the set tensile force). In this manner, under the de-activated condition of the throttle actuator 3, the throttle lever 8 is held at its neutral position, while being sandwiched by the two blocks 11A and 11B urged toward each other with the predetermined spring load. This ensures a high-precision positioning or holding of the throttle lever 8 in the neutral position, and thus permits the throttle valve 2 to return accurately to its predetermined intermediate angular position and then to hold it at the predetermined intermediate angular position. The use of the single resilient member consisting of the tension spring 10 enables a spring-rate characteristic, obtained at the beginning of movement of the throttle linkage in the direction of throttle-valve opening from the predetermined intermediate angular position to conform to a spring-rate characteristic, obtained at the beginning of movement of the throttle linkage in the direction of throttle-valve closing from the predetermined intermediate angular position. This enhances the controllability of the throttle valve in both the throttle-valve opening and closing directions. Additionally, the device of the first embodiment can attain the return-to-neutral operation of the throttle by the single coiled tension spring 10 acting on the two movable blocks 11A and 11B associated with both ends of the armed portion (8A, 8B) of the throttle lever 8, hitherto the return-to-neutral action requires delicate balancing of spring biases caused by a plurality of resilient members. Thus, the return-to-neutral operation is unaffected by manufacturing errors or fluctuations in resilient members. The device of the first embodiment operates as follows.

When the throttle actuator 3 generates a driving force acting in the rotational direction of throttle-valve opening and the driving force is gradually increased and then exceeds the current spring bias of the resilient member 10 (the tension spring), the left-hand armed portion 8A of the throttle lever 8 begins to push the movable member 11A in the throttle-valve opening direction against the tensile force and thus the movable member 11A becomes out of contact with the shoulder portion 9A, and also the tension spring 10 is further extended. As a result, the throttle lever 8 is rotated until the driving force of the actuator 3, acting in the throttle-valve opening direction, is balanced to the tensile force of the extended spring 10. At this time, the other movable member 11B remains abutted on the right-hand shoulder portion 9B. In this manner, it is possible to accurately open the throttle valve 2 to a desired throttle opening based on the magnitude of the driving force of the actuator 3 which force is generated by the actuator 3 and acts in the throttle-valve opening direction. To ensure a precise movement of the movable member 11A on the predetermined curved line, it is preferable to provide a guiding means such as a curved guide groove 14 formed in the throttle body and extending between the shoulder portion 9A and the wide-open throttle stop 12.

Conversely, when the throttle actuator 3 generates a driving force acting in the rotational direction of throttle-valve closing and the driving force is gradually increased and then exceeds the current tensile force of the resilient member 10 (the tension spring), the right-hand armed portion 8B of the throttle lever 8 begins to push the movable member 11B in the throttle-valve closing direction against the spring bias and thus the movable member 11B becomes out of contact with the shoulder portion 9B, and also the spring 10 is further extended. As a result, the throttle lever 8 is rotated until the driving force of the actuator 3, acting in the throttle-valve closing direction, is balanced to the spring bias of the extended spring 10. At this time, the other movable member 11A remains abutted on the left-hand shoulder portion 9A. In this manner, it is possible to accurately close the throttle valve 2 to a desired throttle opening based on the magnitude of the driving force generated by the actuator 3 and acting in the throttle-valve closing direction. To ensure a precise movement of the movable member 11B on the predetermined curved line, it is preferable to provide a guiding means such as a curved guide groove 15 formed in the throttle body and extending between the shoulder portion 9B and the closed throttle stop 13.

Second Embodiment

Figure 2:
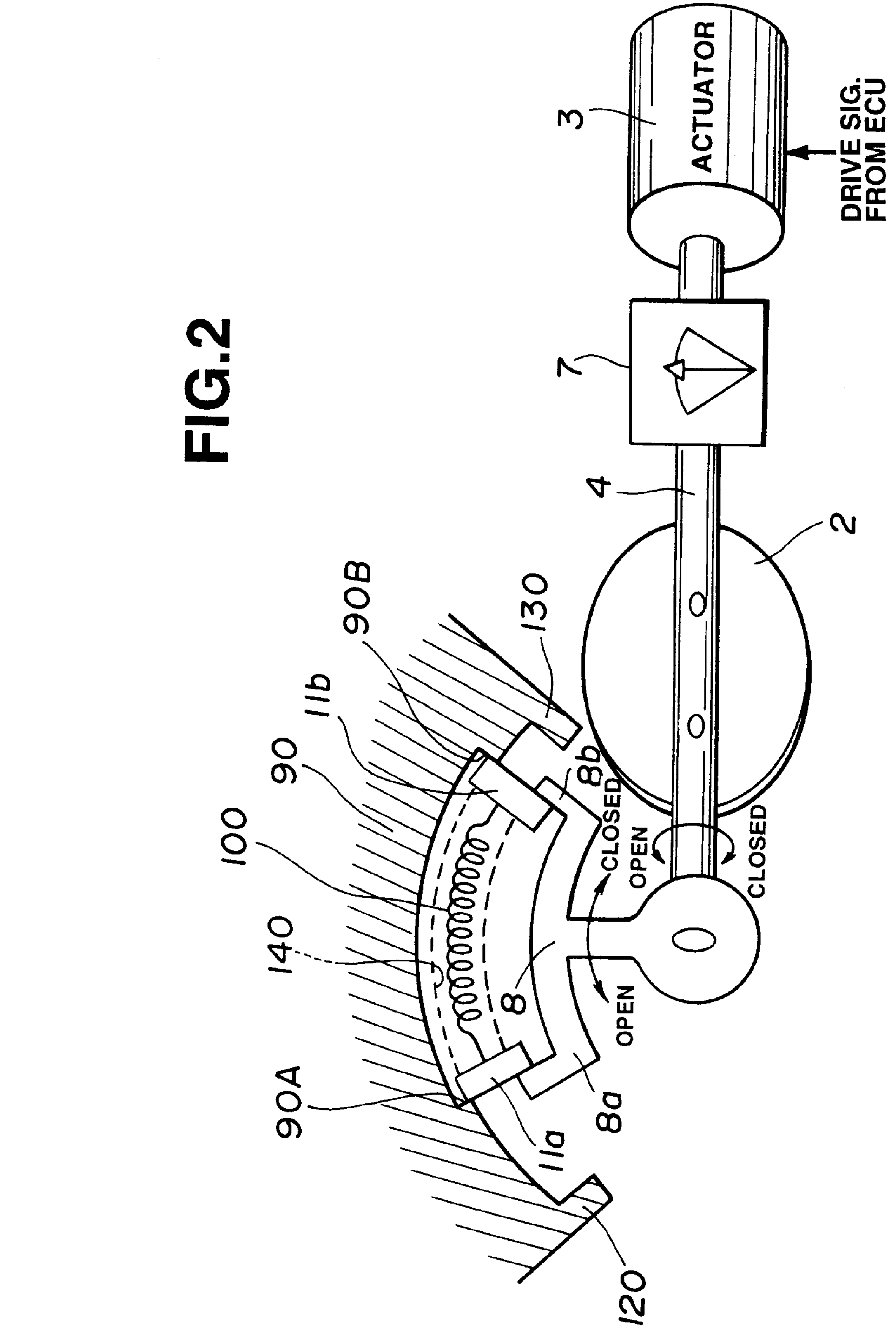
FIG. 2 is a system diagram illustrating a second embodiment of a return-to-neutral device, being applicable to a throttle-return mechanism.
Figure 3:
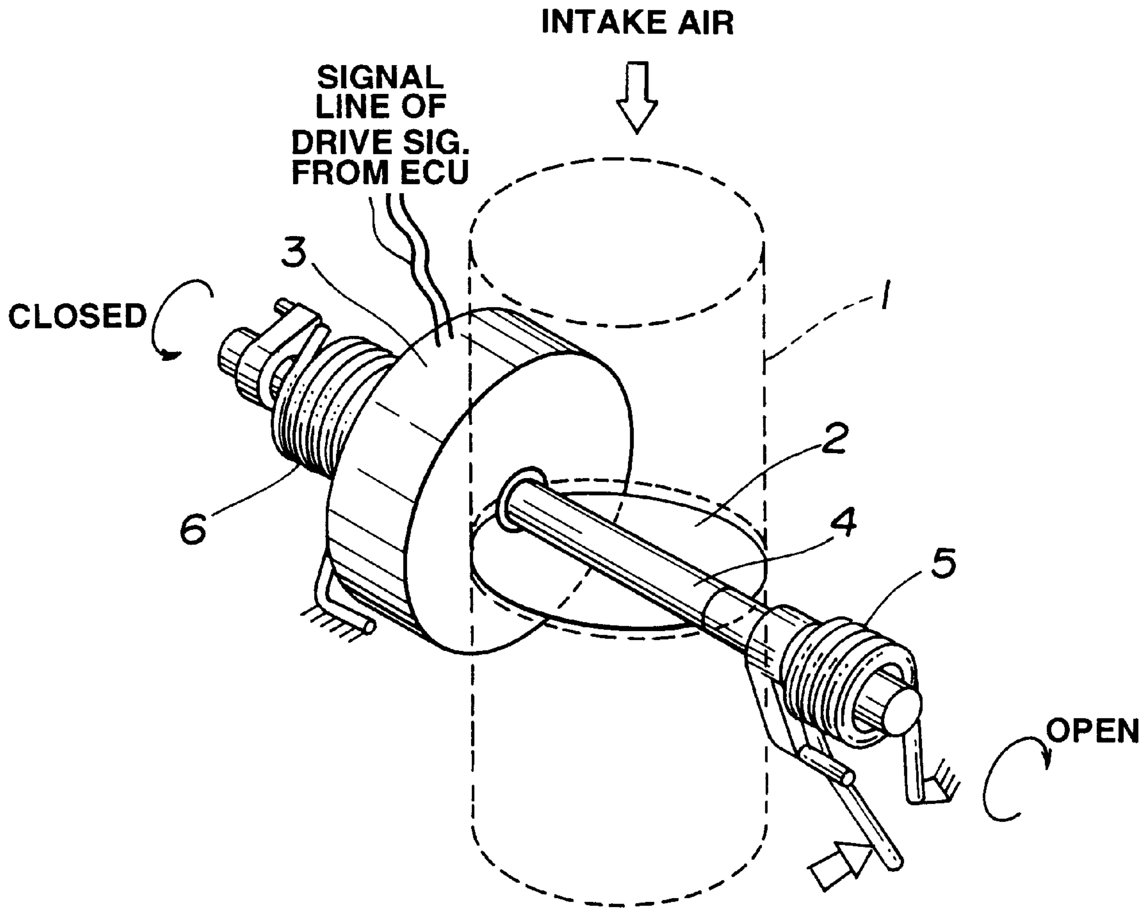
FIG.3 (PRIOR ART)
FIG. 3 is a system diagram illustrating a conventional return-to-neutral device used for a throttle-return mechanism of an electronically-controlled throttle valve.

Referring to FIG. 2, there is shown the return-to-neutral device of the second embodiment. The device of the second embodiment shown in FIG. 2 is similar to the device of the first embodiment shown in FIG. 1, except that the resilient member consisting of a tension spring 10 in FIG. 1 is replaced with a resilient member consisting of a coiled compression spring 100 in FIG. 2. In more detail, when the throttle actuator 3 is inactive, the throttle valve 2 is returned to and held at the predetermined intermediate angular position by way of a tensile force created by the resilient member consisting of the tension spring 10 in the device of the first embodiment. On the other hand, in the device of the second embodiment, the throttle valve 2 is returned to and maintained at the predetermined intermediate angular position by way of a compression force created by the resilient member consisting of the compression spring 100. Since the device of the second embodiment uses a coiled compression spring 100 as a single resilient member, an arcuated arm portion of the throttle lever 8 is formed at both ends with a pair of radially-extending right-angled abutment portions 8*a* and 8*b*. The throttle lever 8 and the radially-extending right-angled abutment portions 8*a* and 8*b* serve as a reciprocating member which reciprocates along a predetermined curved line. The throttle body of the engine defines therein a curved hollow portion 90 so that the curved hollow portion 90 completely opposes over the entire surface of the arcuate outer periphery of the right-angled abutment portions 8*a* and 8*b*, with the throttle lever placed in the neutral position. The single resilient member (the compression spring) 100 is operably disposed in a space defined between the right-angle abutment portions 8*a* and 8*b* and the inner periphery of the curved hollow portion 90. Both ends of the resilient member 100 (the coiled compression spring) are fixedly connected to a pair of movable blocks 11*a* and 11*b*, respectively. When the throttle actuator 3 does not generate any driving force, or when the actuator 3 cannot operate owing to the actuator failure, or the other undesired causes such as breakage in harness connector to the ECU, loose connector contact or the like, the two movable blocks 11*a* and 11*b* are spring-loaded by means of a predetermined spring bias (a predetermined compression force or a set compression force) of the single resilient member 100 consisting of the coiled compression spring, so that the outside wall surface of the movable block 11*a* abuts the inside wall surface of the right-angled abutment portion 8*a* and the stepped end 90A of the curved hollow portion 90, and so that the outside wall surface of the movable block 11*b* abuts the inside wall surface of the right-angled abutment portion 8*b* and the stepped end 90B of the curved hollow portion 90. The single compression spring 100 is installed in a manner as to be pre-compressed slightly by a predetermined length from its free length in the neutral position of the throttle valve unit. The pair of stepped portions 9*a* and 9*b* of the curved hollow portion 90 serve to position the throttle linkage including the throttle lever 8 and the throttle-valve shaft 4 at the predetermined neutral position (corresponding to a predetermined throttle-valve intermediate angular position) with the throttle actuator 3 de-activated. In FIG. 2, reference sign 120 denotes a wide-open throttle stop, whereas reference sign 130 denotes a closed throttle stop. When the throttle actuator 3 generates a driving force acting In the rotational direction of throttle-valve opening (clockwise), and thus the right-hand side movable block 11*a* is rotated anti-clockwise through the throttle linkage (4, 8, and 8*b*) the maximum possible anti-clockwise angular displacement of the left-hand side movable block 11*a* (or the maximum possible angular displacement of the throttle valve 2 in the vale opening direction) is restricted by the wide-open throttle stop 120. On the contrary, when the actuator 3 generates a driving force acting in the rotational direction of the throttle-valve closing (counterclockwise), and thus the left-hand side movable block 11*a* is rotated clockwise through the throttle linkage (4, 8, and 8*a*), the maximum possible clockwise angular displacement of the left-hand side movable block 11*a* (or the maximum possible angular displacement of the throttle valve 2 in the valve closing direction) is restricted by the closed throttle stop 130. The wide-open throttle stop 120 and the closed throttle stop 130 exhibit the same effect as the two stops 12 and 13 of the device of the first embodiment.

Assuming that the actuator 3 is not activated owing to unintended causes such as failure in the throttle motor or the ECU, the movable blocks 11*a* and 11*b* are pushed apart from each other by way of the spring bias (compression force) of the single resilient member 100 (the coiled compression spring). As a consequence, the left-hand movable block 11*a* abuts both the stepped end 90A of the curved hollow portion 90 and the inside wall surface of the right-angled abutment portion 8*a* with the predetermined spring load, whereas the right-hand movable block 11*b* abuts the stepped end 90B and the inside wall surface of the right-angled abutment portion 8*b* with the same predetermined spring load. Thus, the anti-clockwise rotational motion of the right-hand side right-angled abutment portion 8*b* of the throttle lever 8 with respect to the throttle-valve opening direction is restricted by the right-hand movable block 11*b* abutting the stepped end 90B, while the clockwise rotational motion of the left-hand side right-angled abutment portion 8*a* of the throttle lever 8 with respect to the throttle-valve closing direction is restricted by the left-hand movable block 11*a* abutting the stepped end 90A under the action of the predetermined spring load (the set compression force or the predetermined holding force). As discussed above, under the de-activated condition of the actuator 3, the throttle lever 8 is held at its neutral position, under the predetermined holding force acting on the throttle lever 8 through the pair of movable blocks 11*a* and 11*b*. The use of the single resilient member consisting of the compression spring 100 enables a spring-rate characteristic, measured at the beginning of movement of the throttle linkage in the throttle-valve opening direction from the predetermined intermediate angular position to conform to a spring-rate characteristic, measured at the beginning of movement of the throttle linkage in the throttle-valve closing direction from the predetermined angular position, thus enhancing the controllability of the throttle valve 2 in both the valve opening and closing directions. In addition, the device of the second embodiment can attain the return-to-neutral operation of the throttle by the single coiled compression spring 100 acting on the movable blocks 11*a* and 11*b* associated with the respective right-angled abutment portions 8*a* and 8*b*. This is effective to avoid the return-to-neutral operation from being affected by manufacturing errors or fluctuations in resilient members. The device of the second embodiment operates as follows.

When the throttle actuator 3 generates a driving force acting in the rotational direction of throttle-valve opening and the driving force is gradually increased and then exceeds the current spring bias of the resilient member 100 consisting of the compression spring, the right-hand abutment portion 8*b* of the lever 8 begins to push the movable member 11*b* in the throttle-valve opening direction against the compression force and thus the movable member 11*b* becomes out of contact with the stepped portion 90B, and also the compression spring 100 is further compressed. As a result, the lever 8 is rotated until the driving force of the actuator 3, acting in the throttle-valve opening direction, is balanced to the compression force of the compressed spring 100. At this time, the other movable member 11*a* remains abutted against the left-hand stepped end 90A. To ensure a precise movement of the movable member 11*b* on the predetermined curved line, it is preferable to provide a guiding means such as a curved guide groove 140 formed in the throttle body and extending between the two stepped ends 90A and 90B of the curved hollow portion 90. Conversely, when the actuator 3 generates a driving force acting in the rotational direction of throttle-valve closing and the driving force is gradually increased and then exceeds the current compression force of the resilient member 100 (the compression spring), the left-hand abutment portion 8*a* of the lever 8 begins to push the movable member 11*a* in the throttle-valve closing direction against the compression force and thus the movable member 11*a* becomes out of contact with the stepped portion 90A, and also the compression spring 100 is further compressed. As a result, the lever 8 is rotated until the driving force of the actuator 3, acting in the throttle-valve closing direction, is balanced to the compression force of the compressed spring 100. At this time, the other movable member 11*b* remains abutted against the right-hand stepped end 90B. As may be appreciated, a portion of the previously-noted curved guide groove 140 also insures a precise movement of the movable member 11*b* on the predetermined curved line. As set out above, the device of the second embodiment provides the same effects as the device of the first embodiment.

In the first and second embodiments, although a coiled tensile spring or a coiled compression spring is used as a single resilient member necessary for the return-to-neutral device, to provide the same effects as the first and second embodiments, the coiled spring may be replaced by another type of springs, for example a flat spiral spring, a leaf spring or the like. Alternatively, an elastic force created by an elastic material or an elastomeric material such as a rubber material, a fluid pressure (a hydraulic pressure or an air pressure), or a magnetic force may be used as a resilient member of the return-to-neutral device. Also, in the shown embodiment, although the throttle-valve shaft 4 is connected directly to the output shaft of the throttle actuator 3, it is preferable to provide a reduction gear between the throttle-valve actuator shaft and the throttle-valve shaft 4, to ensure a desired driving torque range of the output of the actuator 3. Furthermore, in the shown embodiment, although the device of the invention is exemplified in an electronically-controlled butterfly throttle valve in a manner as to return the butterfly throttle valve to its neutral position by rotation, it will be appreciated that the device of the invention may be applied to a slide valve being capable of reciprocating on a straight line. Moreover, the device of the invention may be widely used as a device for returning a reciprocating mechanism not including an actuator 3, for example a manually-operated valve unit (i.e., a manually-operated solenoid valve, a manual throttle or the like), to a predetermined position.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A device for returning a reciprocating mechanism to a predetermined intermediate position of reciprocating motion, comprising:

- a reciprocating link (8, 8A, 8B; 8, 8*a*, 8*b*) being included in the reciprocating mechanism and being movable in accordance with a predetermined reciprocating motion;
- a pair of positioning members (9A, 9B; 90A, 90B) provided at both sides of the predetermined intermediate position of reciprocating motion;
- a pair of movable members (11A, 11B; 11*a*, 11*b*) provided at both sides of the predetermined intermediate position of reciprocating motion;
- a single resilient member (10; 100) interconnecting said movable members;

said positioning members being adapted to position said movable members by abutting said movable members against said positioning members via a biasing force created by said single resilient member; and said movable members being adapted to return said reciprocating link to the predetermined intermediate position of reciprocating motion by abutment between said reciprocating link and both of said movable members, for restricting a reciprocating motion of said reciprocating link via the biasing force created by said single resilient member;

wherein, during the reciprocating motion of said reciprocating link, a first movable member of said movable members breaks contact with a first positioning member of said positioning members and additionally said reciprocating link breaks contact with a second positioning member of said positioning members by pushing said first movable member in a direction of increasing the biasing force created by said single resilient member.

2. The device as claimed in claim 1, wherein said reciprocating link is connected to a valve body.

3. The device as claimed in claim 1, wherein a driving force output by an electric motor produces the reciprocating motion of said reciprocating link.

4. The device as claimed in claim 1, wherein said single resilient member comprises a tension spring, and the biasing force of said single resilient member is a tensile force created by said tension spring (10).

5. The device as claimed in claim 1, wherein said single resilient member comprises a compression spring, and the biasing force of said single resilient member is a compression force.

6. The device as claimed in claim 1, which further comprises a guide groove for guiding said movable members along a predetermined line conforming essentially to the reciprocating motion of said reciprocating link.

* * * * *